(12) United States Patent
Wreschner et al.

(10) Patent No.: US 7,277,482 B2
(45) Date of Patent: Oct. 2, 2007

(54) METHOD AND APPARATUS FOR ADAPTIVE SIGNAL COMPRESSION

(75) Inventors: Kenneth Solomon Wreschner, Chandler, AZ (US); Eric Jay Clelland, Tempe, AZ (US); Keith Petticrew, Apache Junction, AZ (US); Robert Lee Trapp, Scottsdale, AZ (US); Chad Rhamy, Phoenix, AZ (US)

(73) Assignee: General Dynamics C4 Systems, Inc., Falls Church, VA (US)

( * ) Notice: Subject to any disclaimer, the term of this patent is extended or adjusted under 35 U.S.C. 154(b) by 746 days.

(21) Appl. No.: 10/157,173

(22) Filed: May 29, 2002

(65) Prior Publication Data

US 2003/0223491 A1 Dec. 4, 2003

(51) Int. Cl.
*H04B 1/66* (2006.01)
(52) U.S. Cl. ............................................ 375/240
(58) Field of Classification Search ............... 375/240, 375/240.02, 240.18–240.2, 240.26; 710/68; 704/500–504; 382/232, 239, 244, 250
See application file for complete search history.

(56) References Cited

U.S. PATENT DOCUMENTS

| 4,701,953 | A | 10/1987 | White |
| 4,829,378 | A | 5/1989 | LeGall |
| 5,737,720 | A * | 4/1998 | Miyamori et al. ........ 704/200.1 |
| 5,822,370 | A * | 10/1998 | Graupe ........................ 375/240 |
| 6,094,631 | A | 7/2000 | Li et al. |
| 6,256,415 | B1 * | 7/2001 | Ratnakar ..................... 382/232 |
| 2002/0065664 | A1 * | 5/2002 | Witzgall et al. ............ 704/500 |
| 2002/0136296 | A1 * | 9/2002 | Stone et al. ........... 375/240.03 |

OTHER PUBLICATIONS

Remguiez J. Rak, "Signal Compression Based On Fourier Transform Vector Qantization", IEEE, 1994, pp. 101-104.
Yuai-Pei Lin and See May Phoong, "Optimal DMT Transceivers Over Fading Channels", IEEE 1999, p. 1397-1400.
Albert P. Berg and Wasfy B. Mikhael, "A Survey Of Techniques For Lossless Compression Of Signals", IEEE 1995, p. 943-946.
Tanja Karp and N.J. Fliege, "Modified DFT Filter Banks With Perfect Reconstruction", IEEE 1999, p. 1404-1414.
Willem Wijmans, "ESA's Quasi-Lossless Data Compression Project", IEE, 1998, Savory Place, London, p. 4/1-4/6.

* cited by examiner

*Primary Examiner*—David C. Payne
*Assistant Examiner*—Aslan Ettehadieh
(74) *Attorney, Agent, or Firm*—Jenner & Block

(57) ABSTRACT

A method and apparatus for adaptive signal compression of unknown signals uses minimal power and bandwidth to transmit data. The method provides adaptive signal compression with minimal loss and distortion by extracting only information of interest and recreating the full signal. The method uses a single resolution filter bank for channelizing a data stream for transmission. The method removes unwanted or unneeded information before transmitting the data by using fidelity and user controls and detection capabilities. The method provides significant signal compression where signals are sparse in frequency, time, or both and does not rely on a priori knowledge of the signal. After transmission, the system generates a signal using the data received as well as filling in the non-transmitted portions of the signal by manipulating the transmitted data. The system then formats the signal into the original data stream using a reconstruction filter bank.

35 Claims, 4 Drawing Sheets

METHOD AND APPARATUS FOR ADAPTIVE SIGNAL COMPRESSION

BACKGROUND OF THE INVENTION

1. Field of the Invention

The present invention relates to the field of signal processing and, more particularly, to a method and apparatus for adaptively compressing, transmitting, and reconstructing signals.

2. Description of the Related Art

Many communications systems have limited transmission bandwidths. These systems often do not perform adequately in view of the ever growing need to send more information quickly and economically. Some systems use inefficient methods that lead to a loss in the quality of the transmitted data. In other instances, systems are replaced with new equipment or use extra power to handle the increased demand for bandwidth or speed. However, many users cannot afford to replace their system's components or use more power. Some systems with limited bandwidth (such as a space to ground communication system) use signal compression to overcome limited bandwidth when transmitting signals.

Compression is the reduction in the size of data in order to save space or transmission time. For example, in a data transmission, compression can be performed on the data content or on the entire transmission unit (including header data) depending on the type of compression. Content compression on data transmission may be as simple as removing all "extra space" characters, inserting a single repeat character to indicate a string of repeated characters, or substituting smaller bit strings for frequently occurring characters. Compression typically is performed by a predefined formula or algorithm that determines how to compress the data. When a compressed signal is received, the signal typically is reconstructed or decompressed to its original or near-original form using the same formula or algorithm.

In some communication systems, typical compression techniques maximize the efficiency of the data transmission. However, many of these techniques do not apply to certain types of systems, such as wideband signal collection systems where an unknown wideband spectrum is digitized. In these types of systems, alternative signal compression techniques are not common. Accordingly, there is a need for a method of signal compression that is efficient, inexpensive, applicable to a variety of systems that receive wideband unknown signals and uses less power.

SUMMARY OF THE INVENTION

The present invention provides an efficient method and apparatus for adaptive signal compression that is energy based (i.e. modulation and data independent) and uses less power and bandwidth to transmit data than conventional compression techniques. The present invention can compress data by as much as 100 to 1 or greater. In addition to providing efficient signal compression, the present invention can transmit large amounts of data in current or legacy systems not designed to handle large bandwidths. Thus, the present invention can provide adaptive signal compression with minimal loss and distortion by extracting only information of interest and recreating a full signal after transmission.

In one embodiment of the present invention, a single resolution filter bank channelizes data for transmission. The use of a single-frequency resolution architecture provides a single time base for framing the data to be transmitted. A single time base can significantly reduce data buffer complexity, buffer controller, and detection processing functions. The filter bank creates individual, frequency selective sub-channels of the input frequency range for each time frame. The time frame is dependent upon the number of channels created by the channelizer. Each sub-channel is represented by three different types of information—power, voltage (video integrated), and threshold detection. In each time frame, the channels whose power exceeds a user defined or application specific threshold are enabled for transmission. The sub-channels in which power does not exceed a threshold are not transmitted, reducing the amount of transmitted data. The system yields significant compression, especially in situations where signals are sparse in frequency, time, or both. The average noise power also is computed and transmitted for use in reconstructing the original data.

During reconstruction, each time frame in the compressed information is reformatted by separating the transmitted data, the noise, and the sub-channel indicators (i.e. which sub-channels were transmitted). The average noise level is adjusted by a user supplied or application specific scale factor prior to regeneration. The regenerated sub-channels are provided to a reconstruction filter bank that reconstructs the input data stream from the sub-channels. The output of the reconstruction filter bank is the original data stream.

DETAILED DESCRIPTION OF THE PREFERRED EMBODIMENT

The present invention preferably is used with a communication system designed to carry unknown wideband data. Transmitting a large amount of data requires great speed or substantial power. The present invention allows for a reduction in the power or speed of the system without decreasing the effective amount of data sent. The present invention improves the link efficiency in a system to provide wideband data with a minimal loss or distortion of data. In the preferred embodiment, a spectrum may contain zero, one, or more desired signals represented by a stream of wideband (digitized) data. Although signals in a spectrum are typically separated by frequency, the present invention does not require it. The present invention uses signal compression to send wideband data over a narrow transmission link. The system compresses the signal by, in part, extracting the data of interest to be transmitted. The receiving end reconstructs the original signal with minimal loss using the transmitted data of interest.

Figure 1:
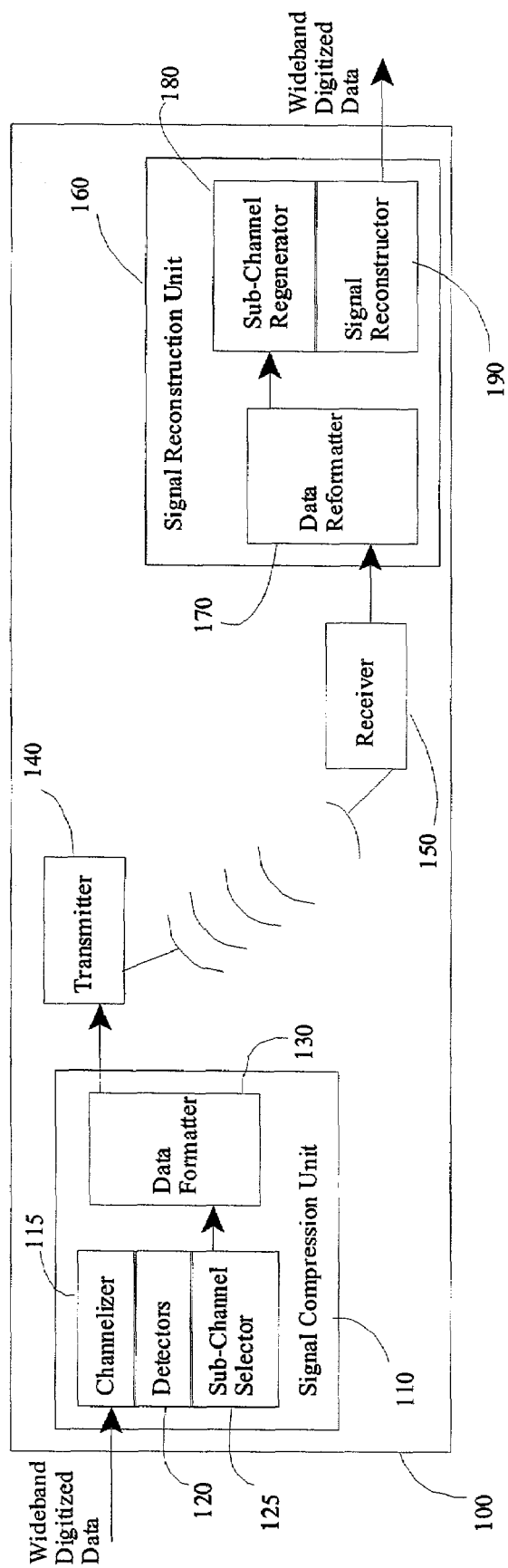
FIG. 1 is a schematic diagram of a compression/reconstruction system in accordance with the present invention.

FIG. 1 shows a typical system 100 in which the present invention may be implemented. System 100 is designed for transmitting wideband digitized data. System 100 includes four primary components: a signal compression unit 110, a transmitter 140, a receiver 150, and a signal reconstruction unit 160. Signal compression unit 110 receives wideband digitized data and compresses the data into a transmission signal. Transmitter 140 sends the compressed signal to receiver 150. In the present invention, the nature of this link is not limited to any specific technology. For example, the transmitter may use an RF (radio frequency) signal, a microwave link between two buildings, a fiber optic line, etc. After receiving the signal, receiver 150 passes the signal to signal reconstruction unit 160. Signal reconstruction unit 160 expands the signal to the original bandwidth and/or sample rate and forwards the data to its destination in its original wideband digitized format.

Signal compression unit 110 includes four sub-components: a channelizer 115, a plurality of detectors 120, a sub-channel selector 125, and a data formatter 130. A channelizer 115 filters and segments the incoming data stream to facilitate the compression and transmission of information. Detectors 120 produce a series of matrices containing information about that particular segmented signal to aid in, among other things, measuring time and frequency of each signal segment. Detectors 120 use the matrices to determine which time-frequency locations in the data signal segment are carrying relevant data. Sub-channel selector 125 uses application specific or user selectable controls to determine which, if any, part of the time and frequency segmented signal is relevant to the receiving end of system 100. Sub-channel selector 125 extracts the relevant data from the segmented signal and passes it to data formatter 130. Information that sub-channel selector 125 does not extract is not passed to data formatter 130. The ability to extract the relevant portions of the segmented signal and to discard the irrelevant portions of the segmented signal is one factor that allows the present invention to compress a segmented signal. The specific function of data formatter 130 is dependent on system 100 but at a minimum provides information regarding which time-frequency segments are being transmitted. Data formatter 130 converts the data to the format needed by transmitter 140 for transmission. For example, data formatter 130 may add routing information, IP addresses, etc., that are required to get the signal from transmitter 140 to receiver 150. Furthermore, depending on the system implementation, transmitter 140 may perform additional functions such as modulating the signal before transmission.

Receiver 150 receives the transmitted data and passes it to signal reconstruction unit 160. Receiver 150 may perform various operations on the received signal. For example, receiver 150 may demodulate a signal modulated by transmitter 140. Signal reconstruction unit 160 reconstructs the compressed transmitted data into its original form before passing it along as wideband digitized data. Signal reconstruction unit 160 includes three sub-components: a data reformatter 170, a sub-channel regenerator 180, and a signal reconstructor 190. Data reformatter 170 performs the converse function as data formatter 130. Like data formatter 130, data reformatter 170 is dependent on system 100. Data reformatter 170 takes the transmitted data and removes all of the specific transmission information so only the user data is passed to the other functions in signal reconstruction unit 160. The specific transmission information is typically information like routing information, IP addresses, etc.

Sub-channel regenerator 180 expands the data received from data reformatter 170 into the original wideband digitized data with its original bandwidth or sample rate. In the preferred embodiment, sub-channel regenerator 180 regenerates the entire time-frequency matrix using the transmitted data from those indices that comprise signals and a value which corresponds to the average random noise level in those indices that were not transmitted. In other embodiments, the random noise value may be scaled to assist the reconstruction. In some instances, sub-channel regenerator 180 will reconstruct the data to a lower rate, but that should not effect the accuracy of the data transmitted as the data can be reconstructed within the fidelity constraints of the Nyquist bandwidth of the lower data rate. Like sub-channel selector 125, sub-channel regenerator 180 is typically application dependent. Signal reconstructor 190 performs a filter operation to reassemble the expanded time-frequency segment into its original wideband time domain data format. Signal reconstructor 190 can be a reverse channelizer. The data is modified to its original or near perfect form. For one of ordinary skill in the art, this is known as perfect reconstruction. After signal reconstruction, the data is passed along as wideband digitized data.

Figure 2:
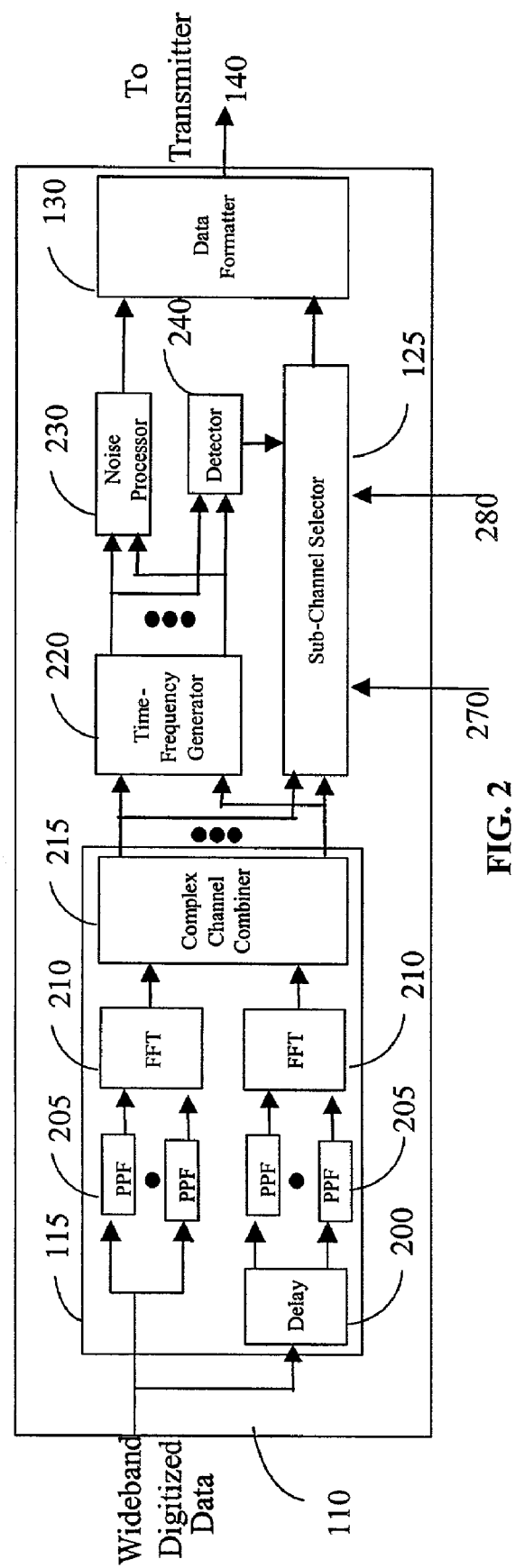
FIG. 2 is a schematic diagram of a signal compression unit of the present invention.

FIG. 2 shows signal compression unit 110 in more detail. Channelizer 115 receives wideband digitized data. Any channelization structure that provides for perfect reconstruction may be utilized. In the preferred embodiment, the channelizer is implemented as a 32-channel analysis filter bank with a 256 tap prototype low pass filter impulse response. The serial sample stream input is de-commutated into two separate 1:32 groupings, each of which is sent to its own 8 tap branch filter. The first grouping is filtered directly by their respective branch filters while the second grouping is delayed by 16 samples prior to being filtered by their respective branch filters. The first filter group output is sent to the input of a 32 point Fast Fourier Transform (FFT), while the second filter group output is sent to another 32 point FFT. Both 32 point FFT outputs are bin-wise combined in such a way as to merge the outputs into 32 channels at twice the FFT output sample rate per channel. This "2×" oversampling allows for alias cancellation in the synthesis (i.e. reconstruction) filter bank.

Channelizer 115 comprises four components: a plurality of poly-phase filters (PPF) 205, a delay 200 for wideband digital data to the second bank of the poly-phase filters 205, two FFT function units 210, and a complex channel combiner 215. Channelizer 115 is a single resolution filter bank that can channelize a wideband digital stream. The use of a single resolution architecture provides a single time base for framing the processed data at the output of channelizer 115. This significantly reduces the data buffer complexity, buffer control, and detection processing functions. Channelizer 115 creates individual, frequency selective sub-channels of the input frequency range each time frame. The time frame is typically dependent upon the number of channels created by channelizer 115. In the preferred embodiment, the time frame is $\frac{1}{16}^{th}$ of the original input sample rate to the channelizer 115. Subsequent processing is performed on a time-frame by time-frame basis.

Figure 3:
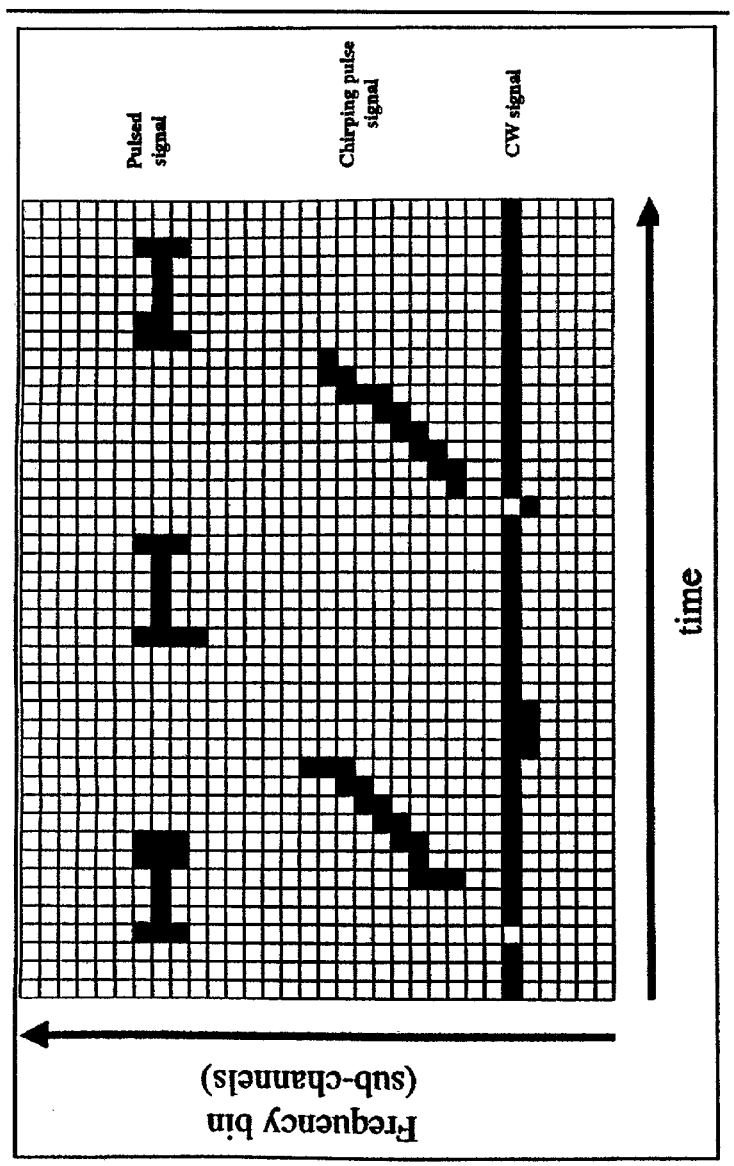
FIG. 3 is a matrix representing an example of energy detection information that can be used in the present invention.

Each sub-channel created by channelizer 115 can be associated with three matrices of information: detection, power, and complex voltage. The detection matrix represents time on the horizontal axis and frequency on the vertical axis. An example of a detection matrix is shown in FIG. 3. Each row in the detection matrix may be described as a frequency bin. Each signal may carry different types of signal information on different frequencies. For example, FIG. 3 shows the information from a segmented signal. The segmented signal in FIG. 3 carries information about three different signal formats: pulsed RF signal, chirping pulse signal, and continuous wave (CW) signal. Each cell in the detection matrix preferably can be in either one of two states, detected or not detected. If the segmented signal has energy above the threshold level at a particular time and frequency, the corresponding cell for that time and frequency will be filled. The threshold energy level is typically a user defined or application specific parameter. In the preferred embodiment, the power matrix is computed as the power in each time-frequency cell. Other conventional computational methods such as correlative computation that provide an estimate of whether a time-frequency segment contains signal information are also applicable.

The power matrix and voltage matrix can have a one-to-one correspondence with the detection matrix. For example, for every cell in the detection matrix, there can be a corresponding cell in the power matrix and a corresponding cell in the voltage matrix. Thus, the power and voltage matrices also are defined by frequency and time. A cell in the power matrix stores information about the amount of signal related energy in the segmented signal at a particular time and frequency. Typically, a cell in the power or voltage matrix has a value, although minimal (i.e. below the threshold value), even though there is no pertinent signal information at that time and frequency. A cell in the voltage matrix stores information about the voltage of the segmented signal at a particular time and frequency measured in volts as a complex number.

The detection matrix is useful because it shows when the energy level is above the threshold value indicating there is pertinent signal information at that time and frequency. Furthermore, if the exact power level or voltage is needed, the system can quickly determine that information by examining the corresponding cell in the power or voltage matrix. In the preferred embodiment, these three matrices are used throughout the system to provide information about a segmented signal. In the present invention, the degree of signal compression typically is gauged by the information in the detection matrix and user supplied fidelity control. In scenarios where signals are sparse in time, frequency, or both, significant compression typically occurs.

Channelizer 115 has many parallel outputs. Each output represents a frequency bin (i.e. channel). The output of each channel is sent to both a time-frequency generator 220 and a sub-channel selector 125. Time-frequency generator 220 uses the complex number stored in the voltage matrix and performs a non-linear function (i.e. a complex square, complex absolute value, etc.) to estimate the total energy. Using the non-linear function, time-frequency generator 220 converts the voltage represented by a complex number to a comparable digital form as the power data, i.e., the comparable value of the voltage measured in watts. Time-frequency generator 220 sends the power data to a noise processor 230 and a detector 240. Detectors 120 in FIG. 1 includes time-frequency generator 220, noise processor 230, and detector 240 shown in FIG. 2.

Noise processor 230 typically makes instantaneous noise measurements of the segmented signals to calculate an average noise level. These measurements are used to detect the signal as well as to reconstruct the original data stream. Specifically, noise processor 230 detects and measures the noise in a segmented signal by accumulating the power in frequency and time bins that are below a user supplied threshold. In the preferred embodiment, the noise threshold is identical to the detection threshold. Because noise varies on each channel, it is important to know how much noise is present in a particular channel or sub-channel. The amount of noise may affect the accuracy of the detection matrix. The present invention can use noise processor 230 to maintain a constant false alarm rate (CFAR). A false alarm occurs when a detection is indicated at a particular time and frequency but no signal data actually is present. In order to maintain a CFAR, noise processor 230 adjusts the threshold level used by the detection matrix based on the amount of noise present in the signal so as to maintain a fixed relationship between the detection threshold and the average noise level. For example, an abundance of noise may increase the probability of a false alarm. However, the noise processor typically would raise the threshold value so even with the increased noise, the false alarm rate (FAR) remains constant. The average noise level is sent to detector 240 and to data formatter 130 to be used in signal reconstruction.

Detector 240 receives the matrices, the power information, and the average noise level from time-frequency generator 220. Detector 240 compares the segmented signal sample by sample (i.e. bin by bin) to determine which channel (i.e. what frequency) and when (i.e. time) the segmented signal has information above the threshold value. It is possible for multiple detections to occur simultaneously. Cells in the detection matrix that contain irrelevant data do not need to be, and preferably, are not transmitted. In the preferred embodiment, the signal is matched to the desired signal characteristics (signal bandwidth and signal duration) using video integration. Other detection methods, such as multiple detectors each matched to a different signal characteristic or correlative detectors, are available to detect the presence of a known or unknown signal. The time and frequency information of the detected cells is passed to a sub-channel selector 125 which uses this information to aid in extracting the desired signal information to be transmitted. System 100 can transmit multiple signals. System 100 can compress the signal because system 100 can remove unwanted information from the data to be transmitted.

Sub-channel selector 125 receives the segmented signal information from detector 240 and the segmented signal from channelizer 115. Sub-channel selector 125 can have two user selectable and/or application specific inputs that aid in extracting desired signal information. User selectable sub-channel control (USSC) 270 determines which part of the segmented signal is relevant. USSC 270 can disable (i.e. not transmit), enable (i.e. transmit) or set adaptively (i.e. transmit when above threshold) for each sub-channel. When USSC 270 is set to disable, the associated frequency is not usually transmitted. In some instances it is useful to disable transmission of known or interfering signals. When USSC 270 is set to enable, the associated frequency bin is typically transmitted. The nominal selection of USSC 270 is adaptive whereby transmission of the segmented spectrum only occurs if a detection occurs. The user has the flexibility to control the data transmitted across frequencies. Accordingly, USSC 270 will specify which signal information needs to be transmitted. USSC 270 aids in compression because undesired information does not need to be transmitted.

The second input, user selectable fidelity control (USFC) 280 determines how much information around the desired cells is transmitted. USFC 280 allows a user to expand in time, frequency, or both, the amount of data that is transmitted. Typically, cells near a desired cell in the matrices have power and voltage information about that portion of the signal. These cells are usually not transmitted because they are below the threshold level. However, because these cells contain information about a portion of the desired signal, they are helpful in reconstructing the compressed signal. A greater number of below threshold cells specified by USFC 280 increases the quality of the reconstruction, but decreases the compression rate. Thus, a user can trade compression efficiency for signal fidelity. Typically, USFC 280 is set by a user or application specific device.

Sub-channel selector 125, using the control information from USSC 270 and USFC 280, analyzes the information from detector 240 to determine the data that needs to be transmitted. These two inputs give the present invention the ability to adaptively select only segmented signal data of relevant cells which allows for adaptive signal compression. Sub-channel selector 125 passes the data of interest from the segmented signal and the sub-channel indicators to data formatter 130. Sub-channel indicators store the sub-channels in which the data of interest are located. Data formatter 130 also receives the average noise level from noise processor 230. Data formatter 130 formats the data into the form needed by transmitter 140. For example, data formatter 130 may convert the data to be sent over a fiber optic line and include the needed routing information so the data properly reaches its destination. After formatting, the data is sent to transmitter 140 for transmission.

Figure 4:
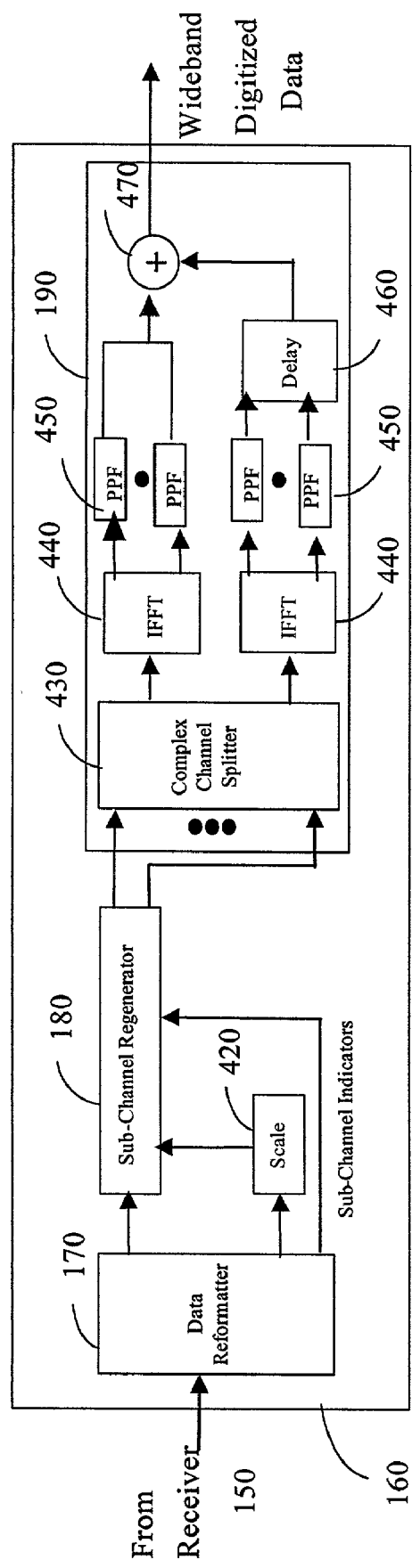
FIG. 4 is a schematic diagram of a signal reconstruction unit of the present invention.

As shown in FIG. 4, signal reconstruction unit 160 receives the transmitted signal from receiver 150. Data reformatter 170 reformats the received signal by reversing the process applied to the signal in data formatter 130. Data reformatter 170 separates the transmitted signal data, the average noise level, and the sub-channel indicators. Data reformatter 170 typically removes any unnecessary information such as header information, etc. The transmitted data, including the sub-channel indicators, is passed to sub-channel regenerator 180. The average noise level is sent to a scale 420. Scale 420 scales (e.g. adds or multiplies) the average noise level based on the number of channels sent and the frequency of those channels using a user supplied or application specific scale factor. The average noise level is typically scaled because the data sent does not correspond to all the possible channels. The average noise level typically is measured before any compression occurs (i.e. all the channels are measured). Thus, scale 420 makes the average noise level proportionate to the number of channels sent. Scale 420 then passes the scaled average noise level to sub-channel regenerator 180.

The transmitted signal data contains the converted voltage data that was calculated during signal compression. The sub-channel indicator contains the information about which bin's voltage data was transmitted and timing information about those bins (i.e. whether they are valid). Sub-channel regenerator 180 uses the complex voltage data, the scaled average noise level and transmitted signal data to recreate the entire spectrum. For sub-channels that were not transmitted, sub-channel regenerator 180 uses a random value whose average power is equal to the scaled average noise level. Sub-channel regenerator 180 recreates the signal at its original bandwidth or sample rate. The process used by sub-channel regenerator 180 to recreate the signal may vary based on the type of signal or purpose of the system.

Sub-channel regenerator 180 passes the generated segmented signal to signal reconstructor 190. Signal reconstructor 190 is an inverse channelizer, also known as a reconstruction filter bank or synthesis filter bank. Signal reconstructor 190 includes a complex channel splitter 430, two inverse FFT's (IFFT) 440, a plurality of polyphase filters 450, a delay 460 of the same length as delay 200, and an adder 470. It allows system 100 to accomplish near perfect or "perfect reconstruction" of the original data stream. Signal reconstructor 190 reconstructs the input data stream using reconstructed segmented signals. Signal reconstructor 190 typically outputs the original wideband digitized data.

There are many alternative embodiments within the scope of the present invention. For example, it is well known in the art that systems may use either analog, digital, or a combination of formats for encoding data, or that various systems (for example, wired, wireless, or a combination thereof) may be used for their network components. Multiple methods are available to generate perfect reconstruction filter banks and could be utilized in place of the filter bank structures described herein. It is also well known that multiple methods are available to detect the presence of a known or unknown signal and that these detection methods could be utilized in place of the energy based detection method described herein. Furthermore, the present invention is not limited to systems delivering wideband digitized data, but can be used in systems transmitting various kinds of data whether wide, narrow, etc., and for various reasons such as to use less power or more speed.

Whereas the present invention has been described with respect to specific embodiments thereof, it will be understood that various changes and modifications will be suggested to one skilled in the art and it is intended that the invention encompass such changes and modifications as fall within the scope of the appended claims.

What is claimed:

1. An energy-based system for transmitting a spectrum, said system comprising:
    a filter bank for channelizing said spectrum into a plurality of segments, wherein one or more of said plurality of segments contains signal data, said filter bank providing for perfect reconstruction;
    a detection unit for identifying as a function of time and frequency the location of signal data contained in one or more of said plurality of segments based on energy detected within said one or more of said plurality of segments; and
    a compression unit for creating a transmission signal based on said signal data and information identifying the location of said signal data, said transmission signal excluding at least certain other data contained in said spectrum, said compression unit having at least one selectable control.

2. The system of claim 1 further comprising:
    a regenerator for creating an expanded transmission signal by recreating said one or more of said plurality of segments of said spectrum containing signal data; and
    a reconstruction filter bank that uses said expanded transmission signal to reconstruct said spectrum.

3. The system of claim 1 wherein said at least one selectable control comprises:
    a selection control that determines which of said one or more of said plurality of segments determined to contain signal data is to be compressed to create said transmission signal; and
    a fidelity control that allows control of signal fidelity.

4. The system of claim 2 wherein said detection unit estimates an average noise level of a signal in said spectrum to maintain a constant false alarm rate.

5. The system of claim 4 wherein said regenerator uses said average noise level in expanding said transmission signal.

6. The system of claim 5 wherein said average noise level is adjusted by a scale factor before being used by said regenerator.

7. The system of claim 1 wherein said detection unit comprises:
    a power detector for detecting a power level in said one or more of said plurality of segments;
    a noise processor for calculating an average noise level of said one or more of said plurality of segments; and a threshold detector for determining if said power level is above a threshold.

8. The system of claim 2 further comprising:
    a first data formatter for formatting said transmission signal;
    a transmitter for transmitting said transmission signal after being formatted;
    a receiver for receiving said transmission signal from said transmitter; and
    a second data formatter for removing the formatting from said transmission signal after being received by said receiver.

9. The system of claim 2 wherein said reconstruction filter bank provides perfect reconstruction.

10. The system of claim 3 wherein the fidelity control comprises a user selectable control of additional data to be included in said transmission signal.

11. The system of claim 10 wherein said additional data is adjacent in time and/or frequency to said signal data.

12. An apparatus for adaptive compression and reconstruction of a spectrum, comprising:

a signal compression unit adapted to identify the presence and location, with respect to time and frequency, of data of interest contained in said spectrum based on energy detected within said spectrum, selectively extract said data of interest from said spectrum to the exclusion of at least some other data contained within said spectrum, and create a transmission signal comprising said data of interest and information identifying said data of interest;

a transmitter adapted to transmit said transmission signal;

a receiver adapted to receive said transmission signal; and a signal reconstruction unit adapted to reconstruct said spectrum based on said transmission signal;

wherein said signal compression unit comprises:

a channelizer adapted to segment said spectrum into a plurality of sub-channels;

a plurality of detectors adapted to determine the presence and location, with respect to time and frequency, of data of interest in at least one of said sub-channels based on energy detected within said sub-channel, each of said detectors corresponding to a respective one of said plurality of sub-channels;

a sub-channel selector adapted to selectively extract said data of interest from said at least one of said sub-channels; and a data formatter adapted to create said transmission signal based on said data of interest selectively extracted by said sub-channel selector.

13. The apparatus of claim 12 wherein said channelizer provides for perfect reconstruction.

14. The apparatus of claim 12 wherein said channelizer comprises:

a first plurality of filters adapted to receive said spectrum, segment said spectrum into said plurality of sub-channels, and output the segmented spectrum;

a first processor adapted to process said segmented spectrum;

a delay adapted to receive said spectrum and output a delayed spectrum;

a second plurality of filters adapted to receive said delayed spectrum, segment said delayed spectrum, and output the segmented delayed spectrum; and a second processor adapted to process said segmented delayed spectrum.

15. The apparatus of claim 14 wherein at least one of said first plurality of filters and said second plurality of filters comprises a plurality of poly-phase filters.

16. The apparatus of claim 14 wherein at least one of said first processor and said second processor comprises an FFT function unit.

17. The apparatus of claim 12 wherein said channelizer is a single resolution filter bank adapted to provide a single time base for framing data processed therein.

18. The apparatus of claim 12 wherein each of said sub-channels corresponds to at least one of a detection matrix, a power matrix, and a voltage matrix.

19. The apparatus of claim 18 wherein each of said detection matrix, power matrix, and voltage matrix includes information concerning data contained in the corresponding sub-channel.

20. The apparatus of claim 12 wherein each of said plurality of detectors is adapted to determine the presence and location of data of interest within the corresponding sub-channel based on the presence or absence of a threshold level of energy detected within the corresponding sub-channel.

21. The apparatus of claim 12 wherein said sub-channel selector includes a user selectable control.

22. The apparatus of claim 21 wherein said user selectable control is adapted to disable, enable, or selectively enable transmission of data contained in one or more of said sub-channels.

23. The apparatus of claim 21 wherein said user selectable control is adapted to disable or enable transmission of data related in time and/or frequency to said data of interest.

24. The apparatus of claim 21 wherein said user selectable control is adapted to disable or enable transmission of data adjacent in time and/or frequency to said data of interest.

25. The apparatus of claim 21 wherein said user selectable control is adapted to allow balancing of compression efficiency and signal fidelity by controlling the addition of data related to said data of interest to said transmission signal.

26. The apparatus of claim 12 wherein said information identifying said data of interest includes information identifying the location of said data of interest in said spectrum by time and frequency.

27. The apparatus of claim 12 wherein said signal reconstruction unit comprises:

a data reformatter;

a sub-channel regenerator coupled to said data reformatter; and and a signal reconstructor coupled to said sub-channel regenerator.

28. The apparatus of claim 27 wherein said data reformatter is adapted to separate said information identifying said data of interest from said transmission signal and provide said data of interest to said sub-channel regenerator.

29. The apparatus of claim 28 wherein said sub-channel regenerator is adapted to expand said data of interest to the bandwidth of said spectrum.

30. The apparatus of claim 28 wherein said sub-channel regenerator is adapted to expand said data of interest to a bandwidth optimized for the data of interest.

31. The apparatus of claim 27 wherein said signal reconstructor comprises an inverse channelizer adapted to provide perfect reconstruction of said spectrum.

32. The apparatus of claim 12 wherein said transmission signal consists essentially of said data of interest and said information identifying said data of interest.

33. The apparatus of claim 32 wherein said transmission signal further comprises selected other data related to said data of interest.

34. The apparatus of claim 12 wherein said signal compression unit estimates an average noise level of a signal in said spectrum to maintain a constant false alarm rate.

35. The apparatus of claim 34 wherein said reconstruction section uses said average noise level in reconstructing said spectrum.

* * * * *